United States Patent
Koch et al.

(10) Patent No.: US 10,449,818 B2
(45) Date of Patent: Oct. 22, 2019

(54) ROTATION DAMPER FOR A MOTOR VEHICLE

(71) Applicants: AUDI AG, Ingolstadt (DE); Karlsruher Institut für Technologie, Karlsruhe (DE)

(72) Inventors: Tilo Koch, Ingolstadt (DE); Frank Gauterin, Leinsweiler (DE); Bastian Scheurich, Bad Wimpfen (DE); Michael Frey, Ettlingen (DE)

(73) Assignees: AUDI AG, Ingolstadt (DE); Karlsruher Institut für Technologie, Karlsruhe (DE)

( * ) Notice: Subject to any disclaimer, the term of this patent is extended or adjusted under 35 U.S.C. 154(b) by 270 days.

(21) Appl. No.: 15/541,199

(22) PCT Filed: Dec. 12, 2015

(86) PCT No.: PCT/EP2015/002499
§ 371 (c)(1),
(2) Date: Jun. 30, 2017

(87) PCT Pub. No.: WO2016/112941
PCT Pub. Date: Jul. 21, 2016

(65) Prior Publication Data
US 2018/0244121 A1 Aug. 30, 2018

(30) Foreign Application Priority Data

Jan. 17, 2015 (DE) .................. 10 2015 000 565

(51) Int. Cl.
*B60G 13/18* (2006.01)
*B60G 13/02* (2006.01)
(Continued)

(52) U.S. Cl.
CPC ........... *B60G 13/18* (2013.01); *B60G 13/005* (2013.01); *B60G 13/02* (2013.01); *B60G 13/14* (2013.01);
(Continued)

(58) Field of Classification Search
CPC ...... B60G 13/005; B60G 13/02; B60G 13/14; B60G 13/16; B60G 13/18; B60G 21/08;
(Continued)

(56) References Cited

U.S. PATENT DOCUMENTS 3,909,044 A * 9/1975 Henzel ...................... B60T 7/20
188/112 A
5,628,267 A * 5/1997 Hoshio ................... B63B 39/04
114/122
(Continued)

FOREIGN PATENT DOCUMENTS

DE           647682 C      7/1937
DE      102011101350 A1   11/2012
(Continued)

OTHER PUBLICATIONS

Notification of Transmittal of Translation of the International Preliminary Report on Patentability dated Jul. 27, 2017, in connection with corresponding international application No. PCT/EP2015/002499 (7 pgs.).

(Continued)

*Primary Examiner* — Jake Cook
*Assistant Examiner* — Bobby Rushing, Jr.
(74) *Attorney, Agent, or Firm* — Maier & Maier, PLLC

(57) ABSTRACT

A rotation damper for a motor vehicle. A flywheel driven via a drive with angular velocity and rotating about an axis of rotation is cardanically mounted via a first bearing element and a second bearing element. The flywheel is rotatably mounted on the first bearing element at the rotational angle (Continued)

and the first bearing element is rotatably mounted on the second bearing element at a first rotational angle of a first axis of the flywheel oriented orthogonally to the axis of rotation, and the second bearing element is rotatably mounted at a second rotational angle of a second axis oriented orthogonally to the first axis. The first bearing element is operationally connected to a shaft drive and the second bearing element can be connected by a means to a wheel carrier of the motor vehicle.

8 Claims, 3 Drawing Sheets

(51) Int. Cl.
    *B60G 13/14*     (2006.01)
    *B60G 13/16*     (2006.01)
    *F16F 15/02*     (2006.01)
    *B60G 13/00*     (2006.01)

(52) U.S. Cl.
    CPC .............. *B60G 13/16* (2013.01); *F16F 15/02* (2013.01); *B60G 2202/22* (2013.01); *B60G 2202/42* (2013.01); *B60G 2401/28* (2013.01)

(58) Field of Classification Search
    CPC ............ B60G 2202/22; B60G 2202/42; B60G 2401/28; F16F 15/02; Y10T 74/12; Y10T 74/1282; Y10T 74/1296
    USPC ........................................... 74/5.5, 5.7, 5.95
    See application file for complete search history.

(56) References Cited

U.S. PATENT DOCUMENTS

| | | | |
|---|---|---|---|
| 8,919,213 B2 * | 12/2014 | Davis .................... | B64G 1/286 74/5 R |
| 9,597,942 B2 * | 3/2017 | Koch ...................... | F16F 15/02 |
| 9,731,798 B2 * | 8/2017 | Heyring ................. | B63B 39/04 |
| 2004/0244513 A1 | 12/2004 | Adams et al. | |
| 2014/0217663 A1 * | 8/2014 | Willems ................. | B60G 11/23 267/196 |
| 2015/0316123 A1 * | 11/2015 | Dogel ..................... | F16H 45/02 74/572.2 |
| 2019/0111982 A1 * | 4/2019 | Gordner ................. | B62K 11/00 |

FOREIGN PATENT DOCUMENTS

| | | | | |
|---|---|---|---|---|
| DE | 102013015702 B3 | 12/2014 | | |
| EP | 0650890 A1 | 5/1995 | | |
| EP | 1346854 A1 * | 9/2003 | .......... | B60G 13/006 |
| EP | 2103471 A1 | 9/2009 | | |

OTHER PUBLICATIONS

International Search Report with English translation and Written Opinion dated Mar. 14, 2016 of corresponding International Application No. PCT/EP2015/002499; 13 pgs.

Examination Report dated Oct. 26, 2015 of corresponding German application No. 102015000565.0; 12 pgs.

* cited by examiner

ROTATION DAMPER FOR A MOTOR VEHICLE

FIELD

The invention relates to a rotation damper for a motor vehicle.

BACKGROUND

Rotation dampers that are used to suppress structural vibrations of a motor vehicle are known from prior art. For example, DE 102011 101 350 A1 discloses a damping element for damping of relative movements between a first mass arranged on the wheel suspension side and a second mass arranged on the side of the vehicle body. In this case, the damper element is equipped with at least one rotatable damping part, which is mechanically coupled to the movement and can be displaced into a rotary movement by means of a movable lifting element, wherein at least one spring damping element is integrated in a mechanical movement coupling provided between the lifting element and the rotatable damping part.

SUMMARY OF THE DISCLOSURE

The object of the invention is to provide a rotary damper for motor vehicle, which is provided with a compact design, and in which the damping effect is attributable to a gyroscopically acting flywheel cardanically mounted on the body of the motor vehicle.

The rotation damper according to the invention for a motor vehicle comprises a flywheel driven by a drive and operated about a rotation axis with the angular velocity $\omega_\varphi$, which is cardanically mounted via a first bearing element and a second bearing element. For this purpose, the flywheel is rotatably mounted on a first bearing element at an angle of rotation $\varphi$, and the first bearing element is mounted rotatably on a second bearing element at a first rotation angle $\Theta$ about a first axis that is aligned orthogonally to the axis of rotation of the flywheel, and the second bearing element is rotatably mounted on the body of the motor vehicle at a second angle of rotation $\Psi$ aligned orthogonally with the first axis. In addition, the first bearing element is in operational connection with a shaft drive, and the second bearing element can be connected via a means with a wheel carrier of the motor vehicle body, so that with an inward/outward movement of the wheel carrier, a rotational movement of the second bearing element is caused relative to the body of the motor vehicle at a second angle of rotation $\Psi$. Moreover, the rotation damper also comprises a control device, which controls via the shaft drive the angular velocity $\omega_\Theta$ and/or the torque $M_\Theta$ of the first bearing element about the first axis as a function of the rotation angle $\Psi$ and/or of the torque MT of the second bearing element about the second axis.

According to an embodiment of the rotation damper according to the invention, the first bearing element is in this case designed in the form of a hollow shaft, so that the flywheel is rotatably mounted in its interior at an angle of rotation $\omega$. In addition, the second bearing element is provided with two bearing legs oriented orthogonally to the second axis, and with two bearing struts that are connected to each other and oriented parallel to the second axis, wherein the first bearing element is rotatably mounted between the two bearing struts at the first rotational angle $\Theta$.

With the design according to the invention, a rotation damper is provided in which the damping effect is attributable to a gyroscopically acting flywheel that is cardanically mounted on the body of the motor vehicle and which is provided with a particularly compact construction thanks to the construction of the second bearing element designed as a hollow shaft.

According to a particularly preferred embodiment of the invention, the flywheel is designed in the form of a shaft provided with a circumferential ring—hereinafter referred to as a flywheel shaft—wherein the flywheel shaft is formed as a hollow part in whose interior is integrated the drive of the flywheel. This embodiment has the advantage that due to the nested arrangement of the flywheel shaft and the drive arranged therein, a particularly space-saving construction is enabled.

It is in this case preferred when the integrated drive is designed as an electric motor that is integrated in the flywheel shaft, whose stator is fixedly connected to the first bearing element and whose rotor is designed as a flywheel shaft that is formed as a hollow part.

It is preferred when the flywheel shaft, which is designed as a hollow part, is designed with a rib structure. The rib structure has proven to be particularly advantageous because on the one hand, a weight-optimized construction is enabled in this manner, and on the other hand, cooling of the electric motor that is arranged in the interior is also ensured based on the ribs.

According to a particularly preferred embodiment of the invention, the circumferential ring is formed from a material that is different from the rest of the material of the flywheel shaft, wherein the material of the circumferential ring has a higher density than the rest of the material of the flywheel. This ensures that the inertia sensor of the flywheel, which is required for the gyroscopic effect, is provided with a compact design.

It is also preferred when the first bearing element is arranged in a housing arranged on the second bearing element. This proved to be advantageous because it protects the first bearing element, which is rotatable relative to the second bearing element, against external influences such as falling rocks.

The shaft drive of the first bearing element is preferably flanged on a baring strut of the second bearing element. The shaft motor is preferably designed in the form of an electric motor.

According to another preferred embodiment of the invention, a stop limiting the rotary movement of the first bearing element is arranged between the first and the second bearing element, wherein the stop is arranged in such a way that the angle of rotation of the first bearing element is limited to the interval $-\pi/2 < \Theta < +\pi/2$. This ensures in a simple and constructive manner that a singularity, which is to say that "superimposition" of the axis of rotation of the flywheel and of the axis of rotation of the bearing element, will be prevented.

BRIEF DESCRIPTION OF THE DRAWING

Further advantages, features and possible applications of the present invention will become apparent from the following description in conjunction with the embodiment illustrated in the figure.

The drawings show.

DETAILED DESCRIPTION OF THE DRAWING

Figure 1:
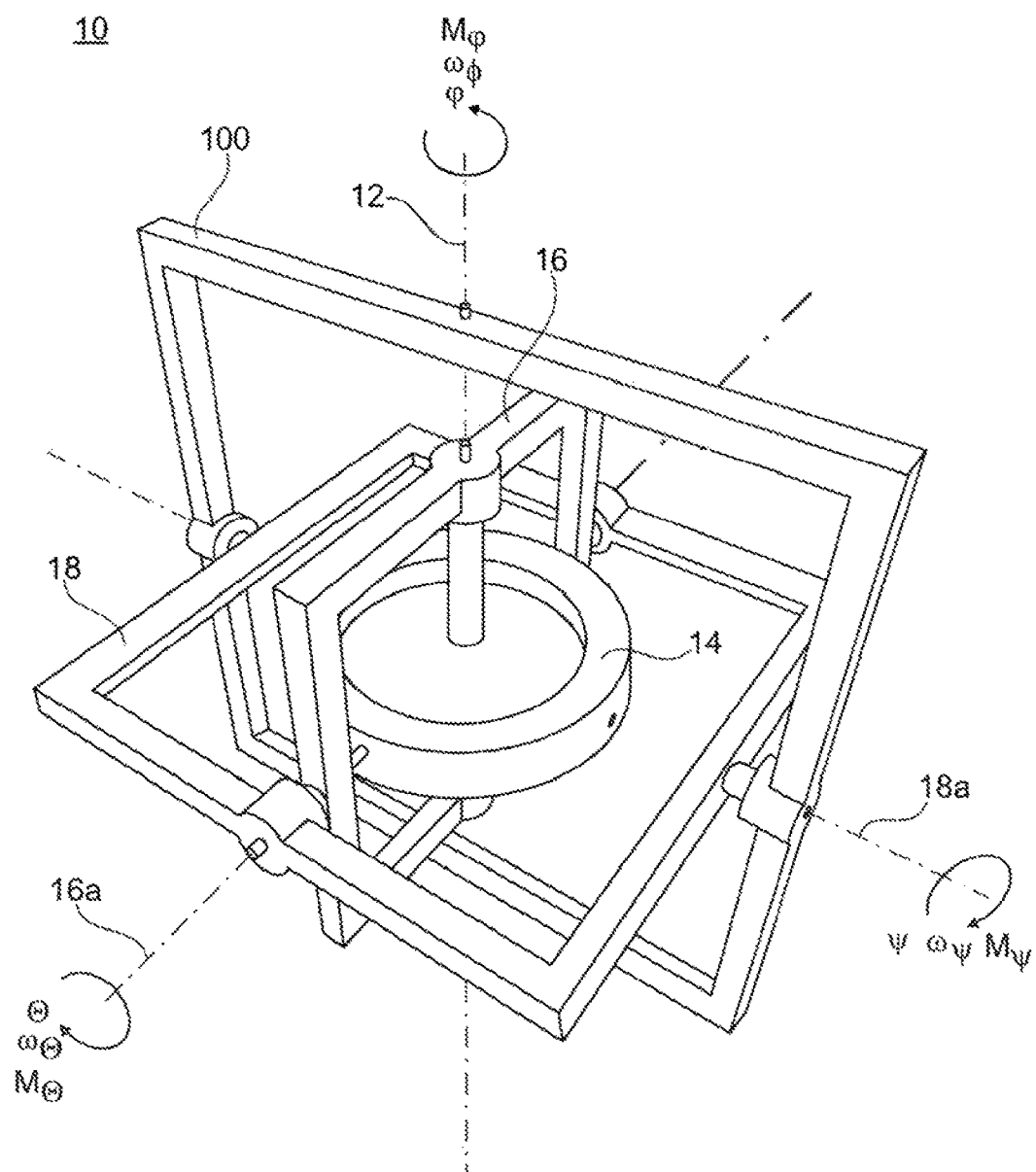
FIG. 1 a schematic representation of the operation of a rotation damper according to the invention, FIG. 2 an oblique top view of a structural embodiment of the rotation damper from FIG. 1, and FIG. 3 a sectional illustration of the rotation damper from FIG. 2.

FIG. 1 shows a rotation damper, designated overall by the reference numeral 10, for a motor vehicle in a schematic illustration.

The rotation damper 10 comprises a flywheel 14 rotating about an axis of rotation 12 with the angular velocity $\omega_\varphi$ that is cardanically mounted via a first bearing element 16 and a second bearing element 18.

Therefore, the flywheel 14 is rotatably mounted at the angle of rotation $\varphi$ on the bearing element 16, and the first bearing element 16 is rotatably mounted on the second bearing element 18 at a angle of rotation $\Theta$ of the first axis 16a oriented orthogonally to the axis of rotation 12, and the second bearing element 18 is rotatably mounted on the motor vehicle body 100 at a second angle of rotation $\Psi$ about a second axis 18a oriented orthogonally to the first axis 16a.

The schematically illustrated rotation damper 10 uses the effect of rotational inertia in order to initiate the forces in the vehicle chassis. These forces are intended to replace and extend the function of a conventional damping element.

The following is a brief explanation of the functional principle"

In the initial state, the flywheel 14 rotates with the angular velocity $\omega_\varphi$ about the axis of rotation 12. When a torque $M_\Theta$ is effective at the first axis 16a of the first bearing element 16, a torque $M_\Psi$ is created due to the precession about the second axis 18a. The momentums lead to an angular velocity of the first or of the second bearing element 16, 18. Consequently, a torque $M_\Theta$ leads to an angular velocity $\omega_\varphi$ of the first bearing element 16. This rotation changes the direction of the angular velocity vector $\omega_\varphi$ of the flywheel 14. The flywheel 14 reacts to such a disturbance with the precession momentum $M_\Psi$ mentioned above. However, since the angular velocity $\omega_\varphi$, which is construction dependent, also changes the angular velocity vector $\omega_\varphi$ of the flywheel 14, there is a direct influence on all three axes. The introduction of energy in an axis indicates a change of the energy of both other axes. If the second bearing element 18 is considered as an input, then $M_\Psi$ and $\omega_\varphi$ are aligned in the same direction. This energy can be removed again on the first axis 16a of the first bearing element 16, so that $M_\Theta$ and $\omega_\varphi$ are oriented in opposite directions. The opposite case is also possible. When components $M_\Psi$ and $\omega_\varphi$ are aligned in the same direction, this leads to unequally oriented amounts of $M_\Psi$ and $\omega_\varphi$. If all of the energy of the torque $M_\Theta$ is not removed, then the angular velocity of $\omega_\varphi$ of the flywheel 14 will be increased as a result of the feedback effect. The excess energy is stored in the form of kinetic energy in the rotational movement of the flywheel 14. The transmission ratio of the individual momentums is in this case determined by the inertia levels of the flywheel 14.

If the second bearing element 18 is connected with a wheel carrier so that an inward/outward movement of the wheel carrier causes a torque $M_\Psi$ and an angular velocity $\omega_\Psi$ of the second bearing element 18 about the second axis 18a, a relative movement of the bearing element 16 about the first axis 16a is created. If a counter-momentum $M_\Theta$ to the angular velocity of the first bearing element 16 is applied, the relative movement of the bearing element 16 about the first axis 16a will be damped. This leads again to the damping of the angular velocity $\omega_\Psi$ of the second bearing element 18 about the second axis 18a. The damping will be stronger or weaker depending on the magnitude of the component of the counter-momentum $M_\Theta$.

On the other hand, if a momentum $M_\Theta$ that is oriented in the same direction is applied, this results in a support for the inward/outward movement. This means that the rotation damper 10 can be also used as an actuator in order to actively position vertical forces on the wheel carrier and thus to assume functions of an active chassis.

Figure 2:
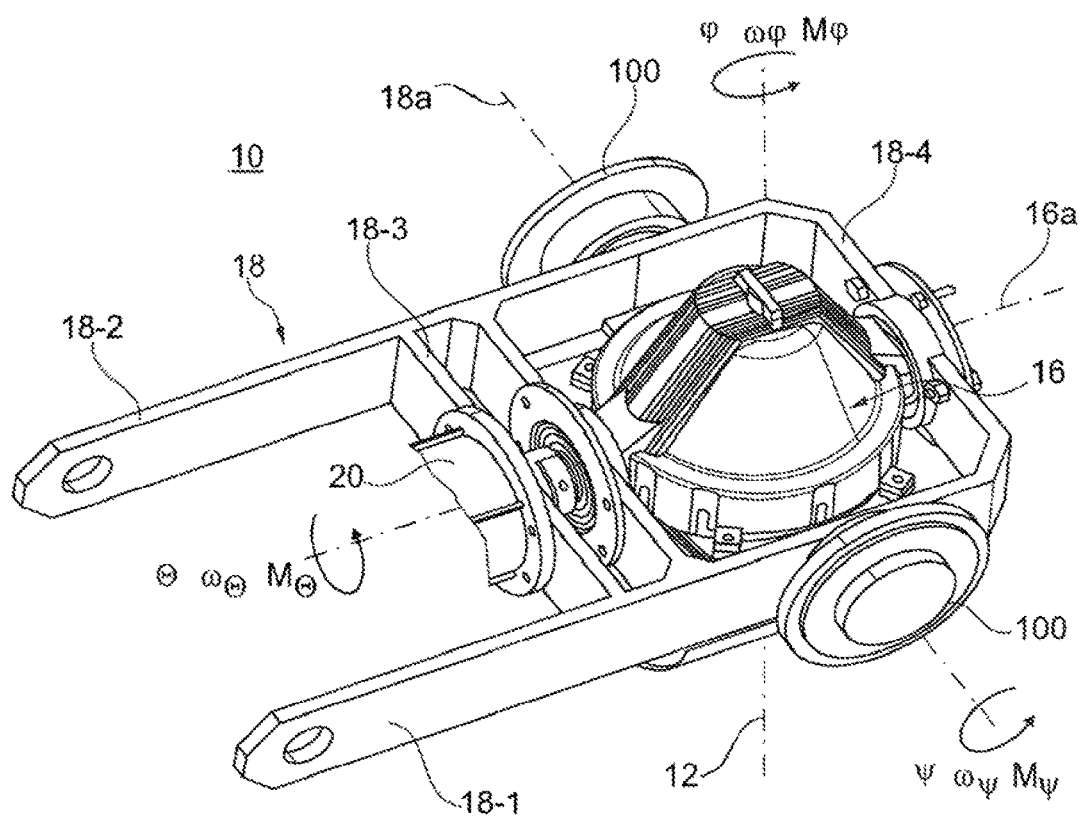
Figure 3:
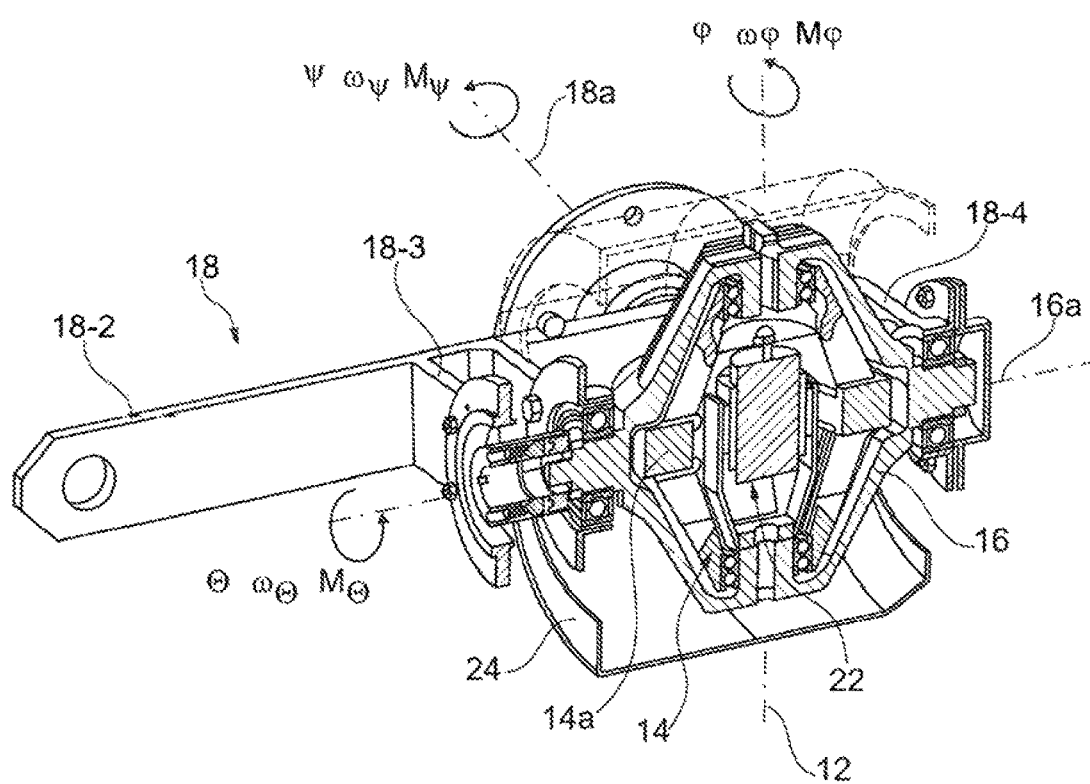

A design of the construction of the rotational damper is shown in FIGS. 2 and 3.

As one can see from FIG. 2, the structural design is characterized in that the second bearing 18 is designed in the form of two bearing legs 18-1 and 18-2 oriented orthogonally to the second axis 18a, and two bearing brackets 18-3 and 18-4 connecting both bearing legs 18-1, 18-2, wherein the first bearing element 16 is rotatably mounted at the angle of rotation $\Theta$ between both bearing brackets 18-3 and 18-4 of the first bearing element 18.

Furthermore, as one can see from FIG. 2, on the bearing 18-3 is flanged to a shaft motor 20 that is operationally connected to the first bearing element 16.

As one can see from the sectional view illustration shown in FIG. 3, the first bearing element 16 is designed in the form of a hollow shaft, so that the flywheel is rotatably mounted in its interior. In this case, the flywheel 14 is designed in the form of a shaft provided with a circumferential ring 14a— hereinafter referred to as flywheel shaft 14, which in its turn is also designed as a hollow part, and in whose interior is mounted a drive 22 that is required for the drive of the flywheel.

In the present case, the circumferential ring 14a is constructed from a different material than the material of the flywheel 14, so that the material of the circumferential ring 14 has a higher density than the rest of the material of flywheel 14.

In the present case, the material is selected in such a way that the flywheel shaft has an inertia of approximately $J=0.01$ kgm$^2$ considered in the direction of it axis of rotation, and of approximately $J=0.005$ kgm$^2$ in both other directions.

With respect to the issue of the materials of the flywheel shaft 14, it is important to ensure that a very high density of the ring 14a will be achieved. Embodiments made of tungsten or other materials having a density $\rho$–7,800 kg/m$^3$ are conceivable.

The drive 22 of the flywheel 14 is in the present case designed as an electric motor, which has a stator that is fixedly connected to the first bearing element 16 and a rotor that is designed as flywheel 14 in the form of a hollow part.

Further, the flywheel 14 is formed with a rib structure. The rib structure has proven to be particularly advantageous because on the one hand, a weight-optimized construction is made possible in this manner, while on the other hand, cooling of the electric motor that is arranged in the interior is also ensured thanks to the ribs.

In addition, as one can see from FIG. 3, a housing 24 is arranged at the second bearing element 18, in which is accommodated in a protective manner the first bearing element 16.

According to the illustrated embodiment, the second bearing element 18 is connected to the wheel carrier and/or to a control arm in such a way that a vertical movement of the wheel carrier results in a rotation of the second bearing element 18 about the second axis 18a. However, another possible embodiment would be to use the complete second bearing element 18 as a transverse or longitudinal control arm of a motor vehicle axle. This control arm would then have integrated damping characteristics.

The invention claimed is:

1. A rotation damper for a motor vehicle, comprising:
   a flywheel driven via a drive and rotating with angular velocity about an axis of rotation is cardanically mounted via a first bearing element and a second bearing element,
   wherein the flywheel is rotatably mounted on the first bearing element at an angle of rotation of the axis of rotation and the first bearing element is rotatably mounted at the second bearing element at a first rotational angle of a first axis oriented orthogonally to the axis of rotation of the flywheel, and the second bearing element is rotatably mounted at a second rotational angle of a second axis oriented orthogonally to the first axis,
   wherein the first bearing element is operationally connected to a shaft drive and the second bearing element is connected via a means to a wheel carrier of the motor vehicle,
   wherein the first bearing element is designed in the form of a hollow shaft in whose interior is rotatably mounted the flywheel about the angle of rotation, and
   wherein the second bearing element is formed with two bearing legs oriented orthogonally to the second axis and two bearing brackets connecting both bearing legs, oriented parallel to the second axis, wherein the first bearing element is rotatably mounted at the first rotational angle of the first axis between both bearing brackets.

2. The rotation damper according to claim 1, wherein the flywheel is designed in the form of a flywheel shaft provided with a circumferential ring, wherein the flywheel shaft is designed as a hollow part in whose interior is arranged the drive.

3. The rotation damper according to claim 2, wherein the drive arranged in the flywheel shaft is designed as an electric motor, having a stator that is fixedly connected to the first bearing element and whose rotor is a flywheel shaft that is designed as a hollow part.

4. The rotation damper according to claim 3, wherein the flywheel shaft which is designed as a hollow part, is provided with a ribbed structure.

5. The rotation damper according to claim 3, wherein the circumferential ring is formed from a material that is different from the remaining material of the flywheel shaft, wherein the material, wherein the material of the circumferential ring has a higher density than the remaining material of the flywheel shaft.

6. The rotation damper according to claim 1, wherein the first bearing element is arranged in a housing at a second bearing element.

7. The rotation damper according to claim 1, wherein the shaft drive of the first bearing element is flanged to a bearing strut of the second bearing element.

8. The rotation damper according to claim 1, wherein between the first bearing element and the second bearing element is arranged a stop limiting the rotational movement of the first bearing element, wherein the stop is arranged in such a way that the rotation angle of the first bearing element is limited to the interval $-\pi/2 < \theta < +\pi/2$.

* * * * *